(12) United States Patent
Tanioka et al.

(10) Patent No.: US 8,478,516 B2
(45) Date of Patent: Jul. 2, 2013

(54) METHOD AND SYSTEM FOR PROVIDING NAVIGATION ASSISTANCE ON A MOBILE DEVICE

(75) Inventors: Hideaki Tanioka, San Jose, CA (US); Daisuke Ito, Sunnyvale, CA (US)

(73) Assignee: Fujitsu Limited, Kawasaki-shi (JP)

( * ) Notice: Subject to any disclaimer, the term of this patent is extended or adjusted under 35 U.S.C. 154(b) by 463 days.

(21) Appl. No.: 12/781,046

(22) Filed: May 17, 2010

(65) Prior Publication Data

US 2011/0282570 A1  Nov. 17, 2011

(51) Int. Cl.
*G01C 21/00* (2006.01)

(52) U.S. Cl.
USPC ........... 701/400; 701/207; 701/208; 701/209; 701/211; 709/203; 709/206; 345/634; 348/807; 358/453; 707/1; 715/712; 73/607; 370/260; 455/414.1; 455/456.1

(58) Field of Classification Search
USPC .................. 701/207, 208, 209, 211; 709/203, 709/206; 707/1; 715/712; 358/453; 345/634; 348/807; 463/30; 73/607; 370/260; 455/414.1, 455/456.1
See application file for complete search history.

(56) References Cited

U.S. PATENT DOCUMENTS

| | | | | |
|---|---|---|---|---|
| 4,222,274 A | * | 9/1980 | Johnson | 73/607 |
| 4,811,109 A | * | 3/1989 | Shimizu et al. | 358/453 |
| 5,254,984 A | * | 10/1993 | Wakeland | 345/634 |
| 5,532,765 A | * | 7/1996 | Inoue et al. | 348/807 |
| 2002/0065605 A1 | * | 5/2002 | Yokota | 701/211 |
| 2002/0133545 A1 | * | 9/2002 | Fano et al. | 709/203 |
| 2004/0044470 A1 | * | 3/2004 | Matsuoka et al. | 701/209 |
| 2004/0054647 A1 | * | 3/2004 | Inaba et al. | 707/1 |
| 2005/0034074 A1 | * | 2/2005 | Munson et al. | 715/712 |
| 2005/0130738 A1 | * | 6/2005 | Miyamoto et al. | 463/30 |
| 2006/0089792 A1 | * | 4/2006 | Manber et al. | 701/207 |
| 2007/0050378 A1 | * | 3/2007 | Kasatani | 707/10 |
| 2007/0067097 A1 | * | 3/2007 | Haatainen | 701/208 |
| 2007/0184851 A1 | * | 8/2007 | Barnwell et al. | 455/456.1 |
| 2009/0098860 A1 | * | 4/2009 | Wasserman et al. | 455/414.1 |
| 2009/0109879 A1 | * | 4/2009 | Kuusinen et al. | 370/260 |
| 2011/0161427 A1 | * | 6/2011 | Fortin et al. | 709/206 |

* cited by examiner

*Primary Examiner* — James Trammell
*Assistant Examiner* — Sanjeev Malhotra
(74) *Attorney, Agent, or Firm* — Baker Botts L.L.P.

(57) ABSTRACT

Methods and systems for providing navigation assistance on a mobile device are provided. A method may include extracting information from at least one of a first map image and an address image, wherein the first map image is a digitized picture of a non-digitized map and the address image is a digitized picture of a non-digitized written address. The method may also include communicating the extracted information to a mapping service server. The method may further include receiving, from the mapping service server in response to communicating the extracted information, a second map image including routing information for assisting navigation of a user of a mobile device. The method may additionally include displaying the second map image including the routing information.

4 Claims, 6 Drawing Sheets

METHOD AND SYSTEM FOR PROVIDING NAVIGATION ASSISTANCE ON A MOBILE DEVICE

TECHNICAL FIELD

This disclosure relates in general to communication systems and more particularly to a method and system for providing navigation assistance on a mobile device.

BACKGROUND

In recent years, the functional capabilities of mobile devices (e.g., cellular phones, smart phones, personal digital assistants, etc.) have increased significantly. For example, in addition to allowing users to make phone calls, mobile devices now allow users to maintain contacts, browse the Internet, send and receive email and text messages, listen to music, watch movies, and provide navigation by way of global positioning satellites and/or mapping software or services. However, mapping software or services (including web-based map services such as Google Maps and Yahoo! Maps, for example) often depict a significant amount of information—sometimes so much information that a user may have difficulty in finding desired information in such a map. A less-detailed map, for example as may be found in a paper map or handwritten map, may be more desirable, but does not provide for automatic identification of location or automatic routing between locations as is the case with mapping software or services.

In addition, individuals must often refer to handwritten or other non-digitized information (e.g., one or more handwritten addresses or one or more typed, but non-digitized, addresses) in order to reach a desired destination. If an individual desires to have his ore her mobile device assist in reaching such destination, the individual must often manually enter such address information, which may be cumbersome and prone to error.

SUMMARY OF THE DISCLOSURE

The present disclosure provides methods and systems for providing navigation assistance to a user of a mobile device.

A method may include extracting information from at least one of a first map image and an address image, wherein the first map image is a digitized picture of a non-digitized map and the address image is a digitized picture of a non-digitized written address. The method may also include communicating the extracted information to a mapping service server. The method may further include receiving, from the mapping service server in response to communicating the extracted information, a second map image including routing information for assisting navigation of a user of a mobile device. The method may additionally include displaying the second map image including the routing information.

Technical advantages of certain embodiments of the present disclosure include allowing a mobile device to assist a user in navigation by providing navigational information that overlays a map provided by the user. Another advantage is the conversion of non-digital (e.g., paper) maps to a web-based digital map without the need for significant manual data entry (e.g., typing). A further advantage is that web-based digital maps and routing information may be created based on written addresses without the need for a user to manually enter (e.g., type) such addresses into a mapping application.

Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Embodiments and their advantages are best understood by reference to FIGS. 1-4C, wherein like numbers are used to indicate like and corresponding parts.

Figure 1:
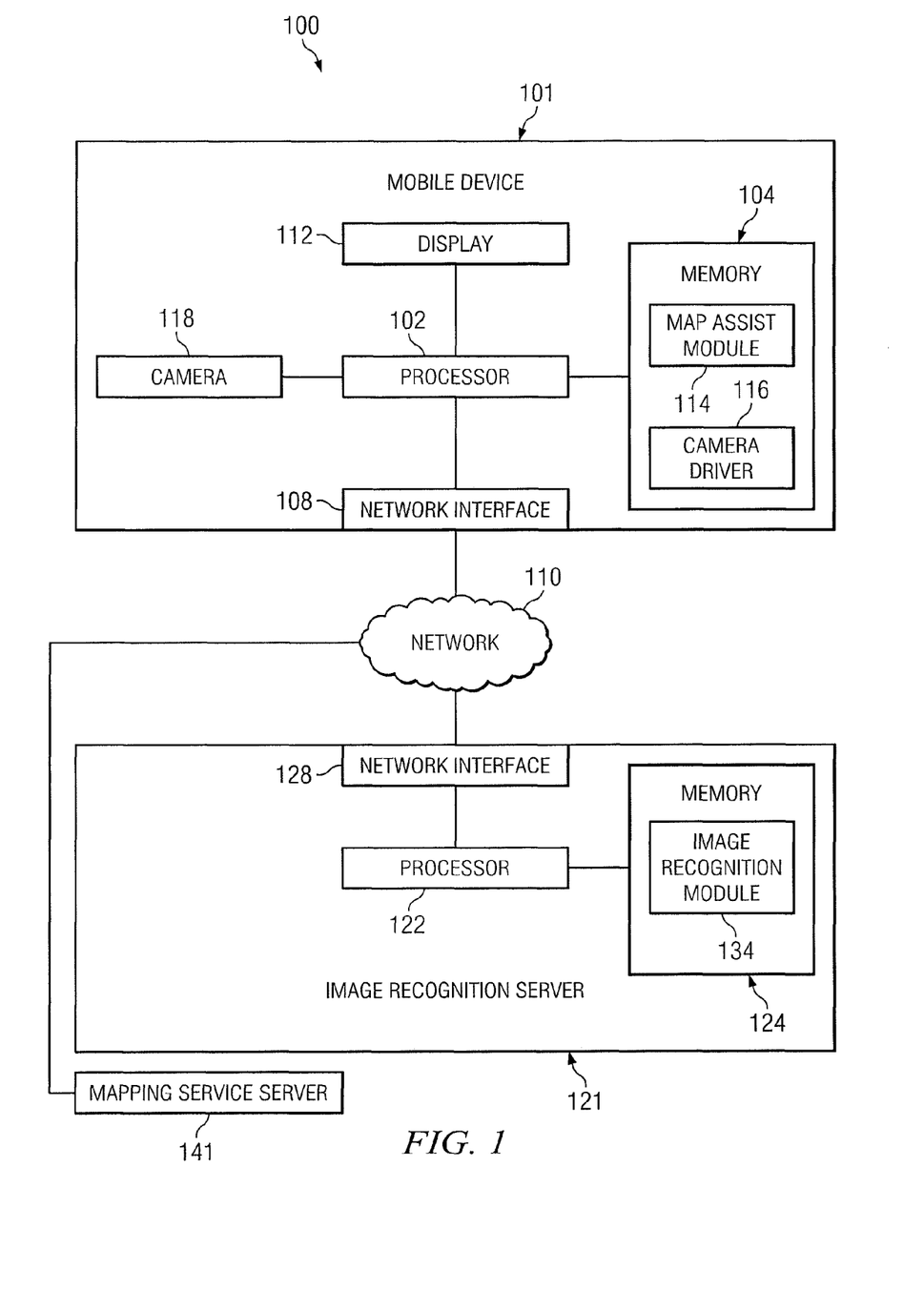
FIG. 1 illustrates a block diagram of an example system for providing navigation assistance on a mobile device, in accordance with certain embodiments of the present disclosure.

FIG. 1 illustrates a block diagram of an example system 100 for providing navigation assistance on a mobile device 101, in accordance with certain embodiments of the present disclosure. As depicted in FIG. 1, system 100 may include a mobile device 101, a network 110, an image recognition server 121, and a mapping service server 141. Mobile device 101 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, mobile device 101 may be a personal computer (e.g., a laptop or notebook computer), a smart phone (e.g., a Blackberry or iPhone), a personal digital assistant, or any other suitable device and may vary in size, shape, performance, functionality, and price.

As shown in FIG. 1, mobile device 101 may include a processor 102, a memory 104, a network interface 108, a display 112 and a camera 118.

Processor 102 may comprise any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 104 and/or another component of mobile device 101. In the same or alternative embodiments, processor 102 may communicate data for display to a user on display 112.

Memory 104 may be communicatively coupled to processor 102 and may comprise any system, device, or apparatus configured to retain program instructions or data for a period of time (e.g., computer-readable media). Memory 104 may comprise random access memory (RAM), electrically erasable programmable read-only memory (EEPROM), a PCM-CIA card, flash memory, magnetic storage, opto-magnetic storage, or any suitable selection and/or array of volatile or non-volatile memory that retains data after power to mobile device 101 is turned off. As shown in FIG. 1, memory 104 may have stored thereon map assist module 114 and camera driver 116. Generally speaking, map assist module 114 may be a program of instructions configured to, when read from memory 104 and executed by processor 102, assist a user of mobile device 101 in navigating such user with respect to a map (e.g., by indicating such user's location on a map via display 112, providing directions and routing between two or more locations to the user via display 112). In some embodiments, map assist module 114 may assist in navigation of a user with respect to an image of a map captured by camera 118. Map assist module 114 and its functionality are discussed in greater detail in with reference to FIGS. 2-4C.

Camera driver 116 may be a program of instructions configured to, when read from memory 104 and executed by processor 102, allow an operating system or other software executing on processor 102 to interact with camera 118 in order to allow a user of mobile device 101 to capture pictures with camera 118, store such images in memory 104, and/or apply such images to map assist module 114.

Network interface 108 may include any suitable system, apparatus, or device operable to serve as an interface between mobile device 101 and network 110. Network interface 108 may enable mobile device 101 to communicate over network 110 using any suitable transmission protocol and/or standard, including without limitation all transmission protocols and/or standards enumerated below with respect to the discussion of network 110. Network interface 108 and its various components may be implemented using hardware, software, or any combination thereof.

Display 112 may be coupled to processor 102 and may include any system, apparatus, or device suitable for creating images (e.g., geometric shapes and/or alphanumeric characters) recognizable to a user. In addition, in some embodiments, display 112 may be configured to detect the presence and/or location of a tactile touch on or proximate to the display 112. Display 112 may include, for example, a liquid crystal display (LCD), a light-emitting diode (LED) display, or an organic LED display, and may employ any suitable mechanism for detecting the presence and/or location of a tactile touch, including, for example, resistive sensing, capacitive sensing, surface acoustic wave, projected capacitance, infrared, strain gauge, optical imaging, dispersive signal technology, or acoustic pulse recognition.

Camera 118 may be communicatively coupled to processor 102 and may include any device configured to record images. Images recorded by camera 118 may be stored in memory 104. In certain embodiments, camera 118 may be used by a user to capture images of non-digitized maps that may be applied to map assist module 114.

Network 110 may be a network and/or fabric configured to communicatively mobile device 101 to image recognition server 121, mapping service server 141, and/or other devices. Network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), a cellular communications network, an intranet, the Internet or any other appropriate architecture or system that facilitates the communication of signals, data and/or messages (generally referred to as data), Network 110 may transmit data using any storage and/or communication protocol, including without limitation, Fibre Channel, Frame Relay, Ethernet Asynchronous Transfer Mode (ATM), Internet protocol (IP), Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA), Integrated Digital Enhanced Network (iDEN), other packet-based protocol, and/or any combination thereof. Network 110 and its various components may be implemented using hardware, software, or any combination thereof.

Image recognition server 121 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. Image recognition server 121 may be a computer or any other suitable device and may vary in size, shape, performance, functionality, and price. As shown in FIG. 1, image recognition server 121 may include a processor 122, a memory 124, and a network interface 128.

Processor 122 may comprise any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 122 may interpret and/or execute program instructions and/or process data stored in memory 124 and/or another component of image recognition server 121.

Memory 124 may be communicatively coupled to processor 122 and may comprise any system, device, or apparatus configured to retain program instructions or data for a period of time (e.g., computer-readable media). Memory 124 may comprise random access memory (RAM), electrically erasable programmable read-only memory (EEPROM), a PCM-CIA card, flash memory, magnetic storage, opto-magnetic storage, or any suitable selection and/or array of volatile or non-volatile memory that retains data after power to image recognition server 121 is turned off.

As shown in FIG. 1, memory 124 may have stored thereon image recognition module 134. Generally speaking, image recognition module 134 may be a program of instructions configured to, when read from memory 124 and executed by processor 122, process images communicated to image recognition server 121 by mobile device 101 in order to assist the navigation of a user of mobile device 101. For example, image recognition module 134 may be configured to read an image of a map communicated from mobile device 101, determine that the image is a map, extract information from the image regarding the contents of the map, and/or synchronize the map with navigational information provided by mapping service server 141. As another example, image recognition module 134 may be configured to read one or more images including one or more maps communicated from mobile device 101 and/or one or more images of a an address location, analyze the images, extract information from the images, and based on the extracted information, communicate information to mobile device 101 to assist a user in navigation. Image recognition module 134 and its functionality are discussed in greater detail in with reference to FIGS. 2-4C. In addition, although image recognition module 134 is depicted as integral to image recognition server 121, some or all of the functionality of image recognition module 134 (whether described in this paragraph or elsewhere in this disclosure) may be performed on mobile device 101.

Network interface 128 may include any suitable system, apparatus, or device operable to serve as an interface between server 121 and network 110. Network interface 128 may enable server 121 to communicate over network 110 using any suitable transmission protocol and/or standard, including without limitation all transmission protocols and/or standards enumerated above with respect to the discussion of network 110. Network interface 108 and its various components may be implemented using hardware, software, or any combination thereof.

Mapping service server 141 may include any instrumentality or aggregate of instrumentalities configured to provide map-based services to devices (including mobile device 101) coupled to mapping service server 141. In some embodiments, mapping service server 141 may include a web-based mapping service, for example Google Maps, Yahoo! Maps, or other similar service.

Figure 2:
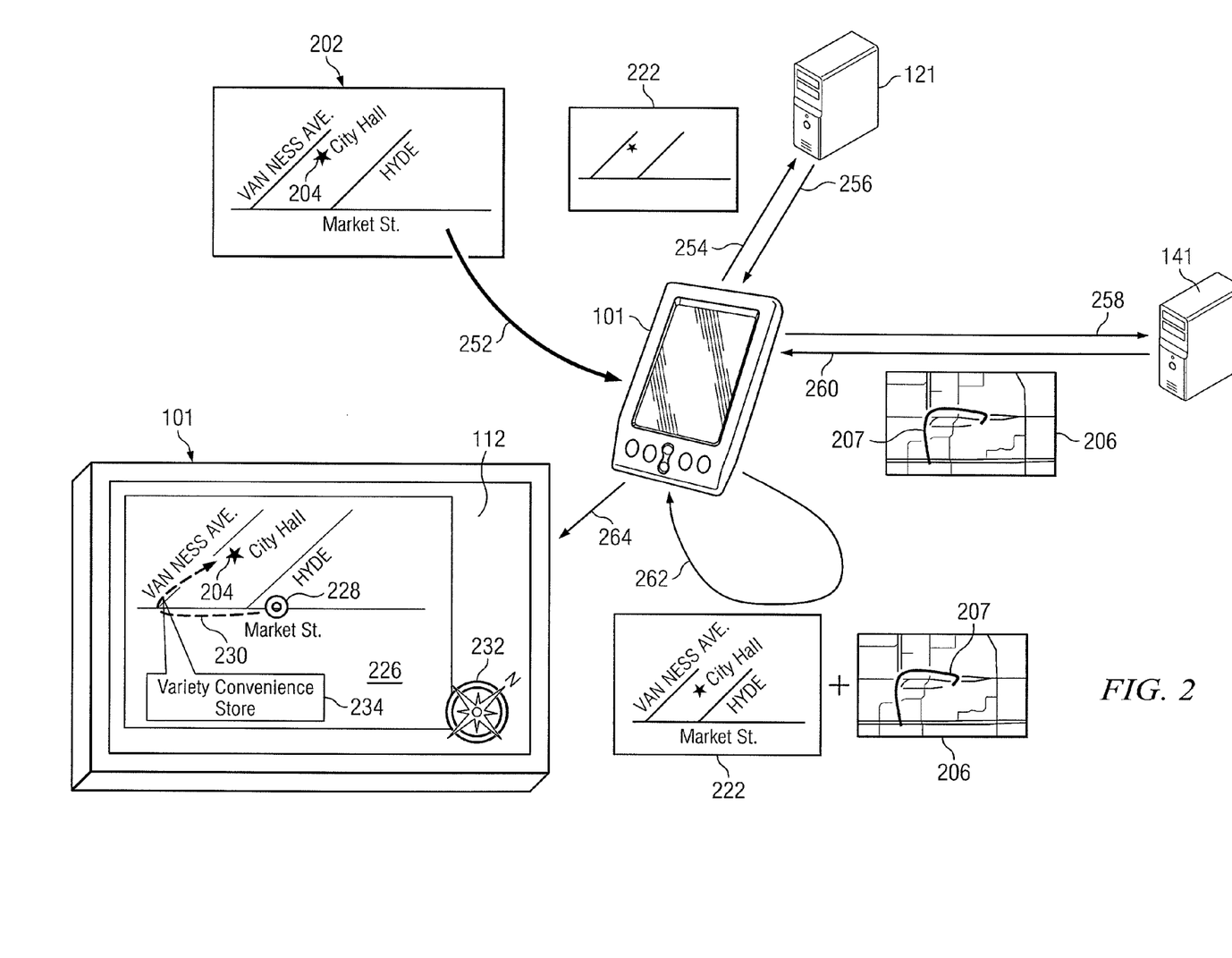
FIG. 2 illustrates an example method of providing navigation assistance to a user of a mobile device based on an image of a map, in accordance with certain embodiments of the present disclosure.

FIG. 2 illustrates an example method of providing navigation assistance to a user of mobile device 101 based on an image of map 202, in accordance with certain embodiments of the present disclosure. At step 252, a user of mobile device 101 may capture an image of a map 202 by, for example, taking a picture of map 202 using camera 118. To capture such image, mobile device 101 may use map assist module 114, camera driver 116, or a combination thereof. Map 202 may be any suitable map, including a handwritten map, hand-drawn map, printed map, sign, and/or other non-digitized cartographic depiction. In certain embodiments, map 202 may include a destination symbol 204 associated with an approximate destination location (e.g., a star, "x," or other suitable character or symbol). After capturing an image of map 202, map assist module 114, camera driver 116, and/or another component of mobile device 101 may store such image (image 222) in memory 104.

At step 254, map assist module 114 and/or another component of mobile device 101 may communicate image 222 to image recognition server 121. In certain embodiments, map assist module 114 and/or another component of mobile device 101 may also communicate other information regarding an approximate geographical location of mobile device 101, for example as may be determined by global positioning system functionality of mobile device 101 (if available), triangulation based on proximity of the mobile device to cell sites or base stations, and/or other suitable methods. In these and other embodiments, map assist module 114 and/or another component of mobile device 101 may also communicate other information regarding a desired starting geographic location other than mobile device 101's present location for routing (e.g., a starting address provided by a user of mobile device 101 or stored as contact information in memory 104 of mobile device 101).

In response to receipt of image 222 and/or other information communicated at step 254, image recognition module 134 of image recognition server 121 may analyze image 222 and/or the other information communicated at step 254, and based on such analysis, extract information associated with image 222. Such extracted information may include an approximate destination address associated with destination symbol 204 and/or geographic coordinates (e.g., latitude, longitude) associated with elements depicted in map 202, including streets, landmarks (e.g., "City Hall"), boundaries of map 202 (e.g., edges of the paper including the map), and/or other characteristics of map 202. At step 256, image recognition module 134 may communicate such extracted information to mobile device 101.

At step 258, map assist module 114 and/or another component of mobile device 101 may communicate to mapping service server 141 the extracted information, information regarding an approximate geographic location of mobile device 101, and/or information regarding a desired starting geographic location for routing other than mobile device 101's present location. Based on such received information, mapping service server 141 may, at step 260, communicate to mobile device 101 an image 206 of a map as well as routing information (e.g., route indicator 207) for navigating an individual to the destination represented by destination symbol 204 from either of the approximate current location of mobile device 101 or another desired starting address.

At step 262, map assist module 114 and/or another component of mobile device 101 may synchronize image 222 (the captured image of map 202), image 206 (the image provided by mapping service server 141), and/or the routing information provided by mapping service server 141 such that the routing information may be overlaid upon map image 222.

At step 264, map assist module 114 may display (e.g., via an appropriate application executing on mobile device 101) image 226 to display 112. Image 226 may be identical or similar to image 222 (the captured image of map 202), except that image 226 may display routing information to assist in navigating a user of mobile device 101 to the destination associated with destination symbol 204. In some embodiments, such routing information may include one or more graphical elements. For example, a graphical element 228 may indicate the present location of mobile device 101 and/or a starting location for navigation (e.g., an address provided by the user or otherwise provided by mobile device 101). As another example, a graphical element 230 (e.g., a solid line, dotted line, or similar element) may indicate a route to be taken by the user in order to reach the desired location. As an additional example, map assist module 114 may display a compass 232, thus indicating the geographical orientation of the map depicted in image 226 relative to cardinal directions (north, south, east, west). As a further example, a graphical element 234 may indicate the existence of a landmark that may aid in navigation.

In certain embodiments, image 226 may be interactive, allowing user of mobile device 101 to interact with image 226 (e.g., resize, shrink, zoom in, etc.). In the same or alternative embodiments, one or more portions of image 226 may include selectable elements that a user may activate (e.g., by touching) in order to invoke display of other information. For example, a user may touch graphical element 234 (relating to a landmark) which may cause map assist module 114 to display a picture of such landmark and/or other information regarding the landmark to display 112. Alternatively or in addition, map assist module 114 may display to display 112 written directions (e.g., turn-by-turn directions) based on the navigational information provided by mapping service server 141.

Thus, advantageously, navigational information may be provided on a map captured by a user of mobile device 101 for which the user may be familiar and avoids clutter of information often present in maps provided by mapping services.

Figure 3:
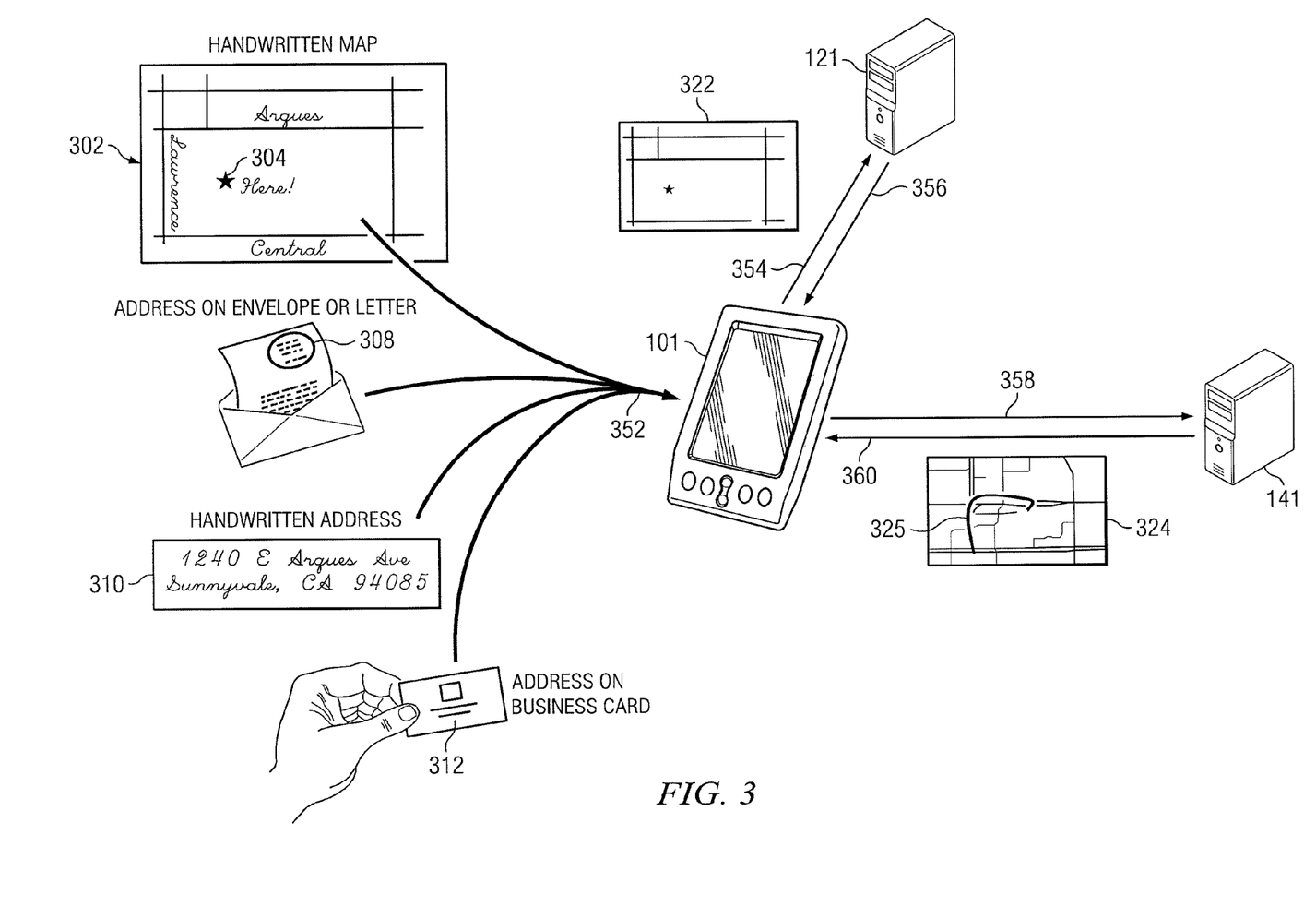
FIG. 3 illustrates an example method of providing navigation assistance to a user of a mobile device based on at least one of an image of a map an image of a written address, in accordance with certain embodiments of the present disclosure.

FIG. 3 illustrates an example method of providing navigation assistance to a user of a mobile device 101 based on at least one of an image of a map 302 an image of a written address 308, 310, 312, in accordance with certain embodiments of the present disclosure. At step 352, a user of mobile device 101 may capture an image of a map 302 and/or one or more images of a written address 308, 310, 312 by, for example, taking a picture of map 302 and/or written addresses 308, 310, 312 using camera 118. To capture such images, mobile device 101 may use map assist module 114, camera driver 116, or a combination thereof. Map 302 may be any suitable map, including a handwritten map, hand-drawn map, printed map, sign, and/or other non-digitized cartographic depiction. In certain embodiments, map 302 may include a destination symbol 304 associated with an approximate destination location (e.g., a star, "x," or other suitable character or symbol). Addresses 308, 310, 312 may be written (e.g., handwritten, machine-printed, etc.) on any suitable medium (e.g., paper, signage, etc.). For example, a written address may appear on a letter or envelope (e.g., address 308), may be handwritten on a piece of paper (e.g., address 310), or may be typed or printed on a piece of paper, such as a business card (e.g., address 312). After capturing an image of map 302 and/or addresses 308, 310, 312, map assist module 114, camera driver 116, and/or another component of mobile device 101 may store such images (represented generically as image 322) in memory 104.

At step 354, map assist module 114 and/or another component of mobile device 101 may communicate image(s) 322 (e.g., one or more captures images of map 302, addresses 308, 310, 312) to image recognition server 121. In certain embodiments, map assist module 114 and/or another component of mobile device 101 may also communicate other information regarding an approximate geographical location of mobile device 101, for example as may be determined by global positioning system functionality of mobile device 101 (if available), triangulation based on proximity of the mobile device to cell sites or base stations, and/or other suitable methods. In these and other embodiments, map assist module 114 and/or another component of mobile device 101 may also communicate other information regarding a desired starting geographic location other than mobile device 101's present location for routing (e.g., a starting address provided by a user of mobile device 101 or stored as contact information in memory 104 of mobile device 101).

In response to receipt of image(s) 322 and/or other information communicated at step 354, image recognition module 134 of image recognition server 121 may analyze image(s) 322 and/or the other information communicated at step 354, and based on such analysis, extract information associated with image(s) 322. Such extracted information may include an approximate destination address associated with destination symbol 304 and/or geographic coordinates (e.g., latitude, longitude) associated with elements depicted in map 302, including streets, landmarks (e.g., "City Hall"), boundaries of map 302 (e.g., edges of the paper including the map), and/or other characteristics of map 302. Such extracted information may also include an address set forth in one or more of written address 308, 310, and 312 (e.g., extracted via optical character recognition or similar method). At step 356, image recognition module 134 may communicate such extracted information to mobile device 101.

At step 358, map assist module 114 and/or another component of mobile device 101 may communicate to mapping service server 141 the extracted information, information regarding an approximate geographic location of mobile device 101, and/or information regarding a desired starting geographic location for routing other than mobile device 101's present location. Based on such received information, mapping service server 141 may, at step 360, communicate to mobile device 101 an image 324 of a map as well as routing information (e.g., route indicator 325) for navigating an individual to the destination represented by destination symbol 304 from either of the approximate current location of mobile device 101 or another desired starting address. Map assist module 114 and/or another component of mobile device 101 may display such map image 324 and/or the routing information on display 112.

Figure 4A:
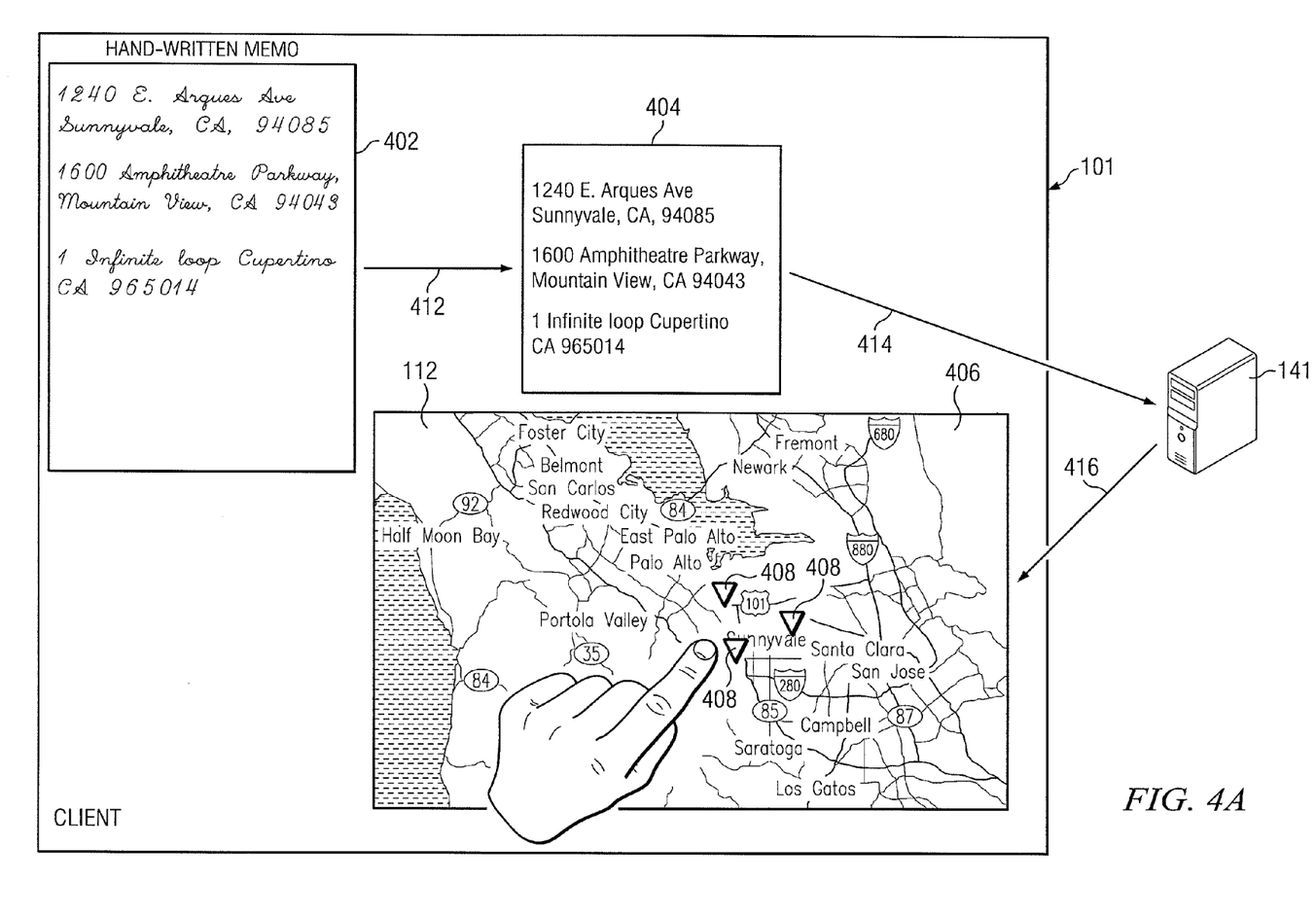
FIGS. 4A-4C each illustrate an example method of providing multiple-destination navigation assistance to a user of a mobile device based on an image of a plurality of written addresses, in accordance with certain embodiments of the present disclosure.
Figure 4B:
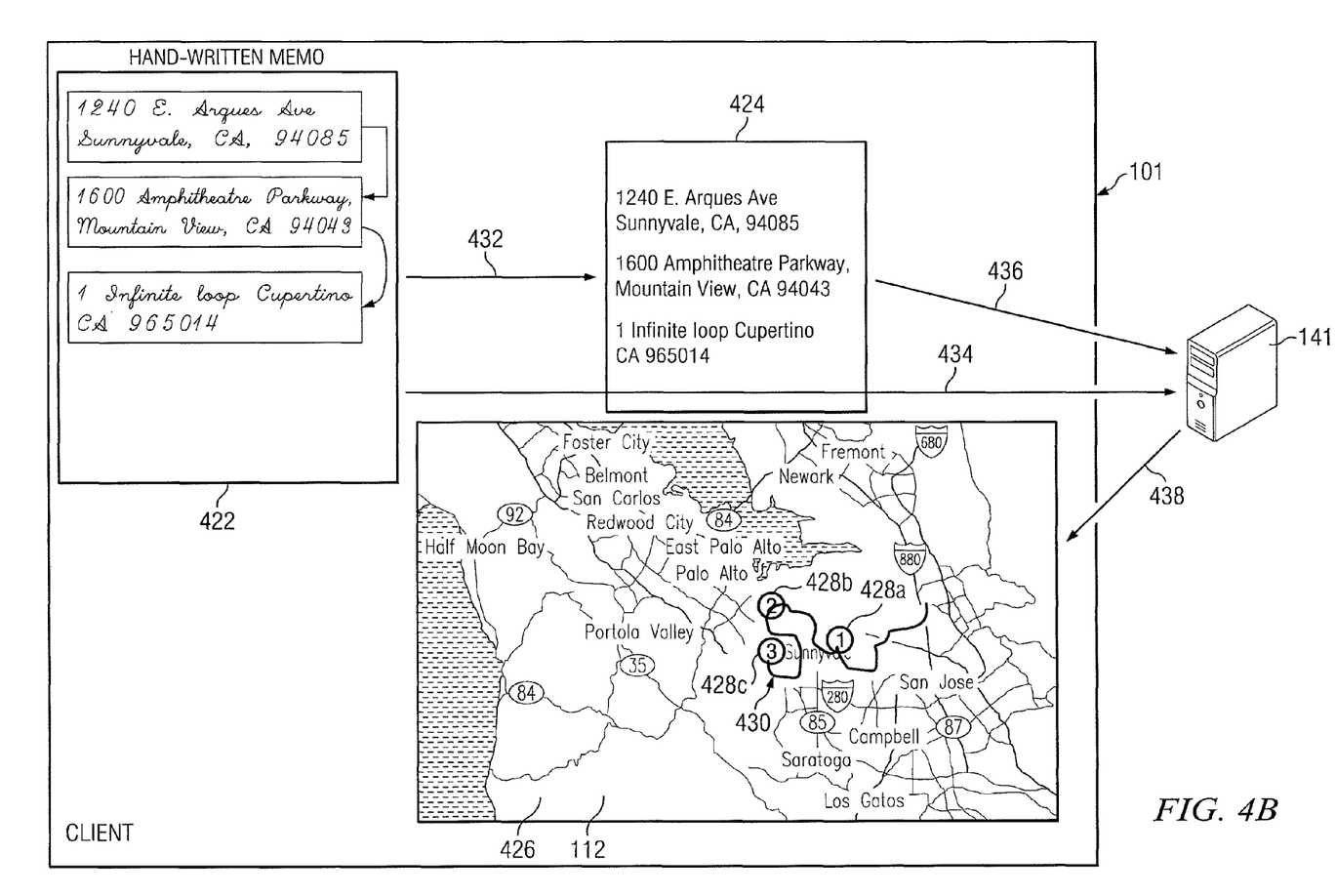
Figure 4C:
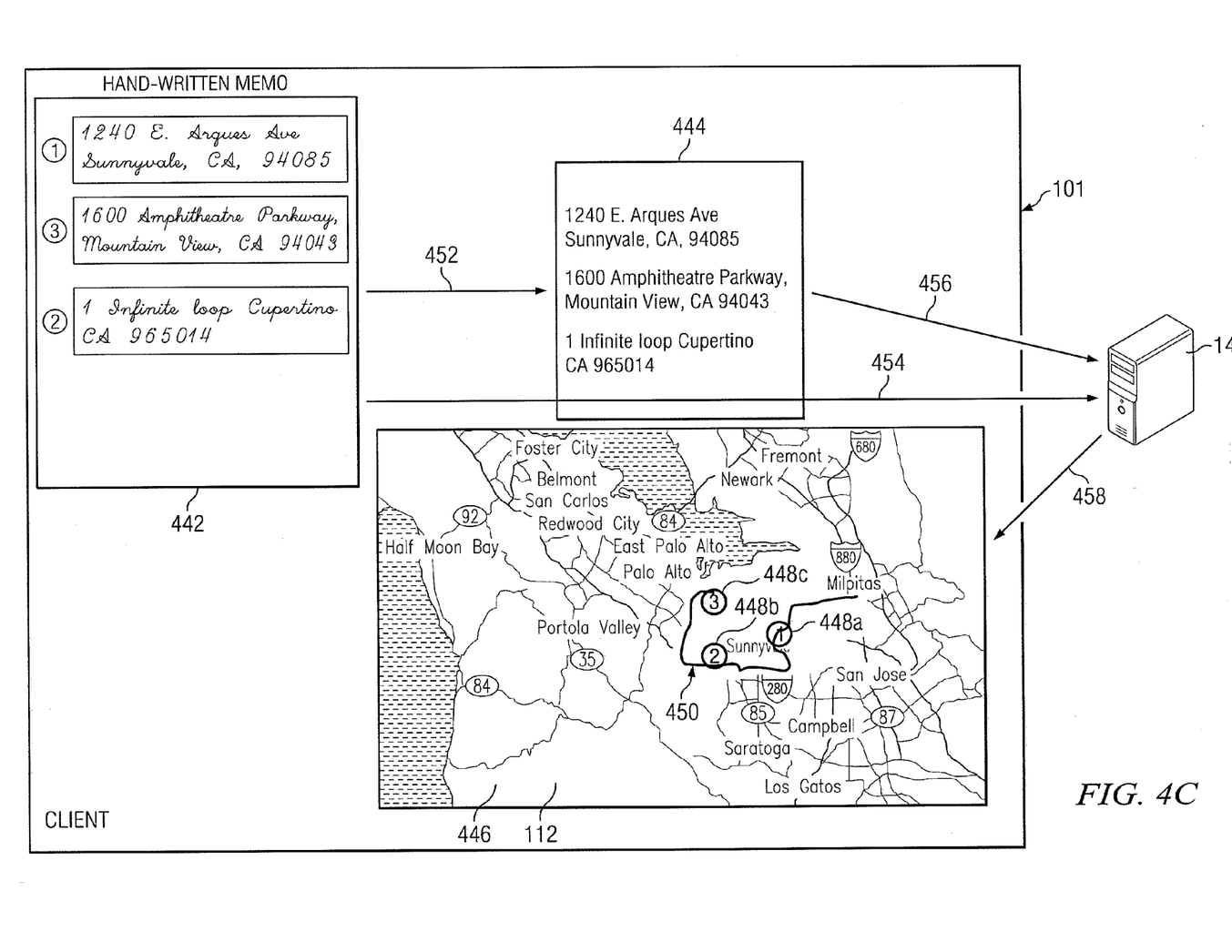

FIGS. 4A-4C each illustrate an example method of providing multiple-destination navigation assistance to a user of a mobile device based on an image of a plurality of written addresses, in accordance with certain embodiments of the present disclosure. In FIG. 4A, an image 402 of one or more written addresses captured by mobile device 101 (e.g., via camera 118) may be communicated to image recognition server 121. At step 412, image recognition module 134 may extract text data 404 from image 402 (e.g., via optical carrier recognition or other suitable method). At step 414, image recognition server 121 may communicate such extracted text data 404 to mapping service server 141. At step 416, mapping service server 141 may communicate to mobile device 101 map data including coordinates within such map data associated with addresses set forth in image 402. Map assist module 114, in response to receiving such map data, may display on display 112 an image 406 depicting such map data, including objects 408 associated with addresses set forth in image 402. In some embodiments, such objects may be touchable or selectable by a user of mobile device 101. A user may touch such objects to select a desired order for navigation of the addresses. Based on such selection and a starting point for navigation (e.g., a user-supplied starting address or the current location of the user) map assist module 114, in connection with mapping service server 141) may calculate a route for navigation and display such route.

In FIG. 4B, an image 422 of one or more written addresses captured by mobile device 101 (e.g., via camera 118) may be communicated to image recognition server 121. In addition to one or more written addresses, the captured image 422 may also include other information indicative of a desired order by which the addresses are to be navigated (e.g., arrows). At step 432, image recognition module 134 may extract text data 424 from image 422 (e.g., via optical carrier recognition or other suitable method). Also, at step 434, image recognition module 134 may detect the desired order by analyzing other information (e.g., directions of arrows) in image 422 and communicate such desired order to mapping service server 141. At step 436, image recognition server 121 may communicate such extracted text data 424 to mapping service server 141. At step 438, mapping service server 141 may communicate to mobile device 101 map data including coordinates within such map data associated with addresses set forth in image 422 and routing information for navigating among the addresses in the indicated desired order. Map assist module 114, in response to receiving such map data, may display on display 112 an image 426 depicting such map data, including objects 428a, 428b, and 428c associated with addresses set forth in image 422, and a route 430 for navigating the addresses in the desired order. In some embodiments, such objects may include information (e.g., numbers) for indicating the desired order for navigation among the addresses.

In FIG. 4C, an image 442 of one or more written addresses captured by mobile device 101 (e.g., via camera 118) may be communicated to image recognition server 121. In addition to one or more written addresses, the captured image 442 may also include other information indicative of a desired order by which the addresses are to be navigated (e.g., numbers indicating desired order). At step 452, image recognition module 134 may extract text data 444 from image 442 (e.g., via optical carrier recognition or other suitable method). Also, at step 454, image recognition module 134 may detect the desired order by analyzing other information (e.g., numbers) in image 442 and communicate such desired order to mapping service server 141. At step 456, image recognition server 121 may communicate such extracted text data 444 to mapping service server 141. At step 458, mapping service server 141 may communicate to mobile device 101 map data including coordinates within such map data associated with addresses set forth in image 442 and routing information for navigating among the addresses in the indicated desired order. Map assist module 114, in response to receiving such map data, may display on display 112 an image 446 depicting such map data, including objects 448a, 448b, and 448c associated with addresses set forth in image 442, and a route 450 for navigating the addresses in the desired order. In some embodiments, such objects may include information (e.g., numbers) for indicating the desired order for navigation among the addresses.

A component of system 100 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Versatile Disk (DVD)), database and/or network storage (for example, a server), and/or other computer-readable medium.

Modifications, additions, or omissions may be made to system 100 without departing from the scope of the invention. The components of system 100 may be integrated or separated. Moreover, the operations of system 100 may be performed by more, fewer, or other components. Additionally, operations of system 100 may be performed using any suitable logic. As used in this document, "each" refers to each member of a set or each member of a subset of a set.

Certain embodiments of the invention may provide one or more technical advantages. A technical advantage may be that data may be applied to an application with a reduction or elimination of risks that: (i) the application provider may abuse or misuse the applied data; and/or (ii) the data provider may abuse or misuse the application, as compared to such risks present in traditional approaches.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
    extracting information from a first map image and an address image, wherein:
        the first map image is a first digitized picture of a non-digitized map; and
        the address image is a second digitized picture of a non-digitized written address;
    communicating the extracted information to a mapping service server; receiving, from the mapping service server in response to communicating the extracted information, a second map image including routing information for assisting navigation of a user of a mobile device;
    displaying the second map image including the routing information; and
    the extracted information includes any one of:
    an approximate destination address associated with at least one of the destination symbol depicted in the first map image and the non-digitized written address; and
    geographical coordinates associated with elements depicted in the first map image.

2. A method according to claim 1, wherein the non-digitized written address includes a handwritten address or a machine-printed address.

3. A method according to claim 1, wherein the second map image includes one or more graphical elements that indicate at least one of:
    a present location of the mobile device;
    a starting location for navigation;
    a destination location for navigation;
    a route to be taken by the user of the mobile device in order to reach a desired location;
    a geographical orientation of the second map image relative to cardinal directions; and
    a geographical landmark.

4. A method according to claim 1, wherein the elements depicted in the first map image include at least one of:
    a street depicted in the first map image;
    a landmark depicted in the first map image; and
    one or more boundaries of the first map image.

* * * * *